April 28, 1964   W. I. FLEMING ETAL   3,130,761
PALLET MAKING MACHINE
Filed April 11, 1961   4 Sheets-Sheet 1

INVENTORS
WALTER I. FLEMING
BY HERBERT A. KREILICK
ATTORNEYS

April 28, 1964 W. I. FLEMING ETAL 3,130,761
PALLET MAKING MACHINE
Filed April 11, 1961 4 Sheets-Sheet 2

INVENTORS
WALTER I. FLEMING
BY HERBERT A. KREILICK

ATTORNEYS

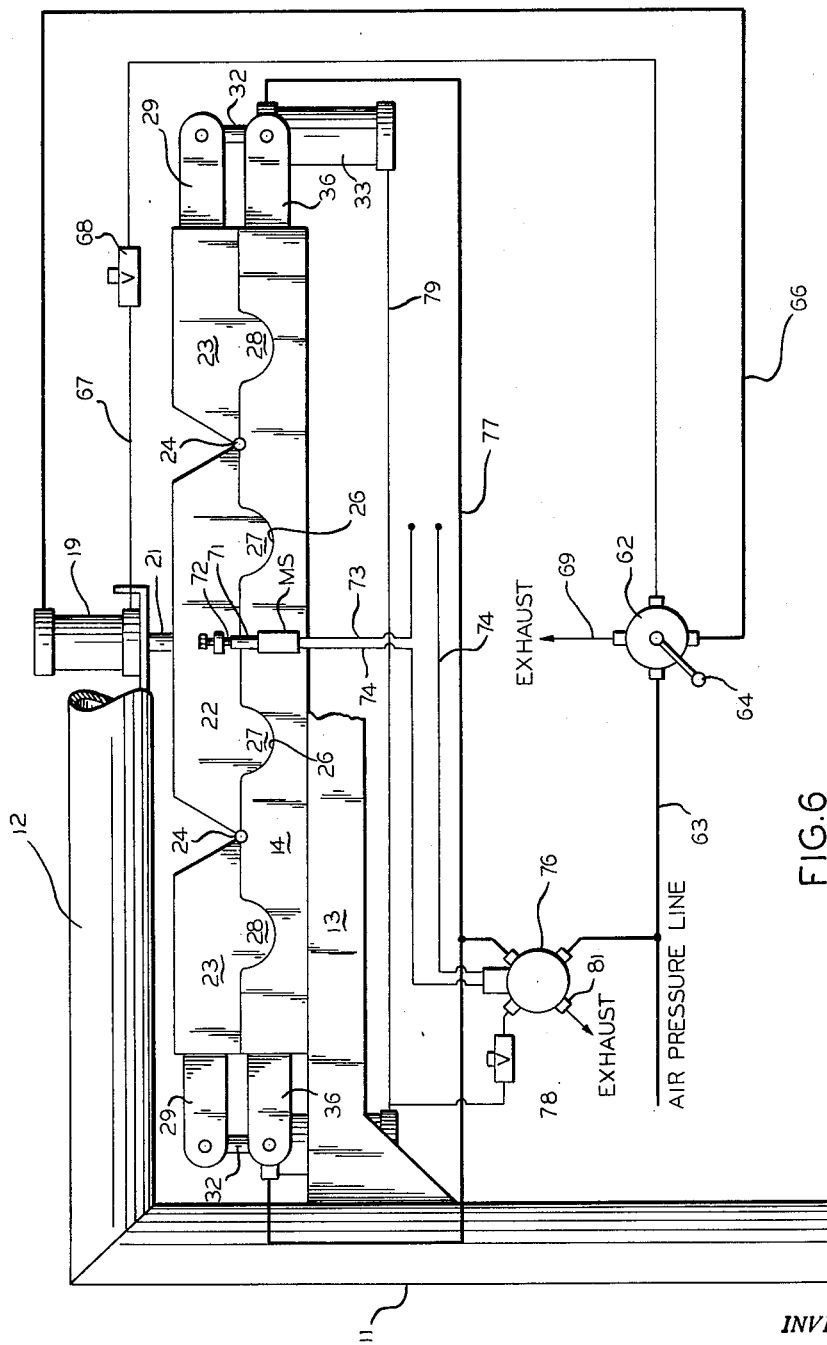

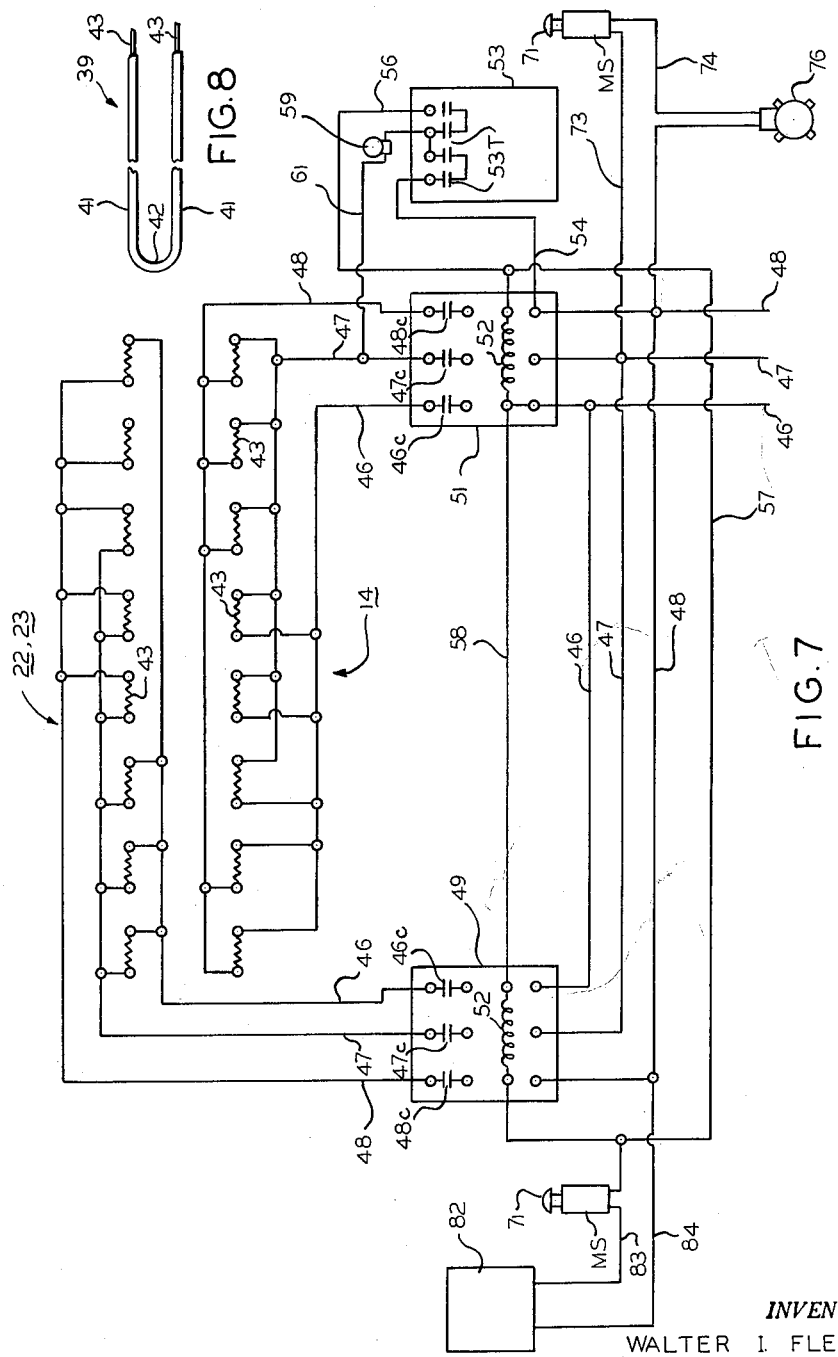

United States Patent Office 3,130,761
Patented Apr. 28, 1964

3,130,761
PALLET MAKING MACHINE
Walter I. Fleming, Dundee, Ill., and Herbert A. Kreilick, Webster Groves, Mo., assignors to Woodkor Corporation, a corporation of Illinois
Filed Apr. 11, 1961, Ser. No. 102,275
2 Claims. (Cl. 144—256)

This invention relates generally to machines for making pallets, and particularly to a machine for making deep corrugations in a flat panel so that the resulting corrugated panel structure desirably may be used as a pallet or be employed as part of a pallet structure.

The machine according to the present invention is adapted to form deep corrugations in a flat panel consisting preferably of a single veneer ply of the thickness of the order of approximately one-quarter inch, and covered on both surfaces with a protective paper. The veneer ply, being of substantial thickness, does not lend itself to deep corrugating operations by reason of its lack of ductility and its tendency to split along its grain in the corrugation thereof. According to the present invention, therefore, the sheet or panel is provided with deep corrugations which are made therein by a sequence of operations which prevents the splitting of the veneer ply in the corrugating operations.

With the foregoing considerations in mind it is a principal object of this invention to provide deep corrugations in a panel of veneer so that the resulting corrugated panel may be employed, if desired, as a pallet structure.

Another object is to provide a machine of the class described for forming deep corrugations in a panel of veneer material, the corrugations therein being formed in a sequence of steps so as to prevent the splitting or checking of the veneer in the corrugating operation.

Another object is to provide a pallet making machine having heated lower and upper platens provided with corrugating grooves and lands, the lower platen being adapted to support a panel for corrugation thereof.

Still another object is to provide a pallet making machine comprising a lower platen and an upper platen comprising a central portion and flanking portions which are pivoted with respect to the central portion, the upper and lower platens having complimentary lands and grooves for forming a deeply corrugated panel, the central portion being adapted to move into contact with the lower platen to form the central portions of the corrugated panel and the flanking portions being thereafter movable toward the lower platen so as to complete the corrugation of the panel.

Other objects and important features of the invention will be apparent from a study of the following specification taken with the drawings which together describe and illustrate a preferred embodiment of the invention, and what is now considered to be the best mode of practicing the principles thereof. Other embodiments may be suggested to those having the benefit of the teachings herein, and such other embodiments are intended to be reserved especially as they fall within the scope and spirit of the subjoined claims.

In the drawings:

FIG. 6 is a view similar to FIG. 3, but showing a circuit for controlling motive fluid for operating the upper platen;

FIG. 7 is a circuit diagram showing heating elements employed with the upper and lower platens seen in the several views; and FIG. 8 is a detail of a heating element employed with the platen seen in the several views.

Figure 1:
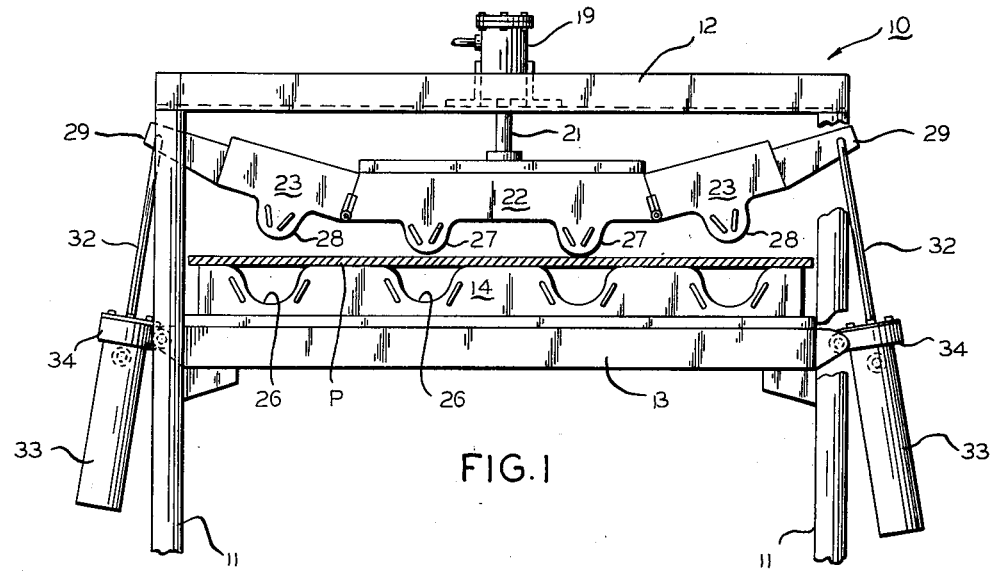
FIG. 1 is an elevational view of a pallet making machine according to the present invention, showing the upper platen in a raised position above a flat panel which it is desired to corrugate.

Referring now particularly to FIGS. 1 to 6 of the drawings, the pallet making machine according to the present invention is referred to generally by the reference numeral 10, and includes paired vertical legs 11 which are spanned at the top thereof by horizontal members 12. The legs 11, there being four in number, provide a support for a lower stage 13, and a lower corrugating platen 14 rests upon the stage 13. The vertical legs 11 have angle members 16 extending therebetween, and these provide a support for a plate 17 which in turn supports angle members 18, 18, see FIG. 5. A number of air cylinders 19 are mounted between the angles 18, and each has a piston rod 21 connected in any suitable fashion to a center upper platen 22 which can be raised and lowered by pressure fluid applied to the cylinders 19. The central upper pressure platen 22 is provided with flanking platen portions 23, 23 which are connected to the central portion 22 by means of a hinge 24.

Figure 4:
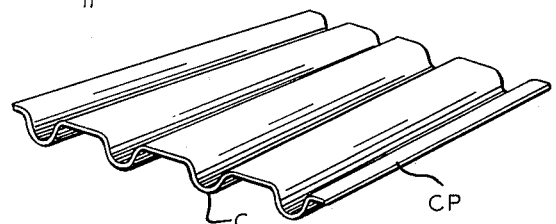
FIG. 4 is a perspective view showing a corrugated pallet formed by the machine according to the invention.

The lower pressure platen 14 is adapted to support a panel P as seen in FIG. 1, so that the same can be corrugated to form a corrugated panel CP as seen in FIG. 4. The panel member P is comprised of a veneer ply which is preferably covered on each face thereof with a protective sheet such as kraft paper or the like, the paper being cemented to the veneer ply by a suitable thermoplastic cement.

The lower pressure platen and the central portion 22 and the flanking portions 23 of the upper pressure platen are provided with complimentary lands and grooves to provide corrugations C in the panel CP seen in FIG. 4. The lower pressure platen 14 is thus provided with parallel corrugated grooves 26 which cooperate with complimentary lands 27 on the central platen portion 22 and similar lands 28 on the flanking portions 23. Obviously, and if desired, the lands can be formed on the lower pressure platen 14 and the complementary grooves formed on the central upper platen 22 and its flanking portions 23.

Figure 2:
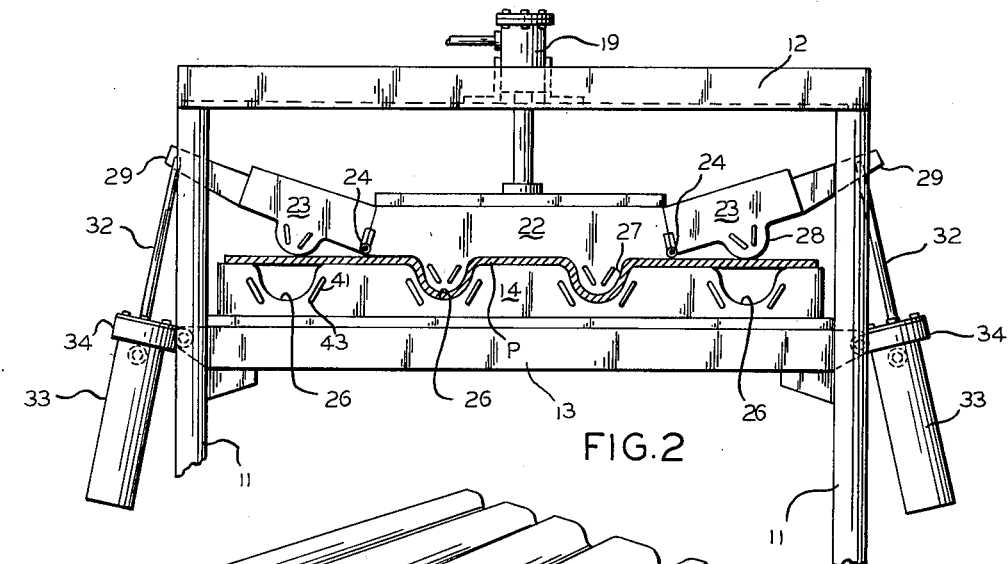
FIG. 2 is a view similar to FIG. 1, but showing the corrugations first formed in the central portions of the flat panel.
Figure 3:
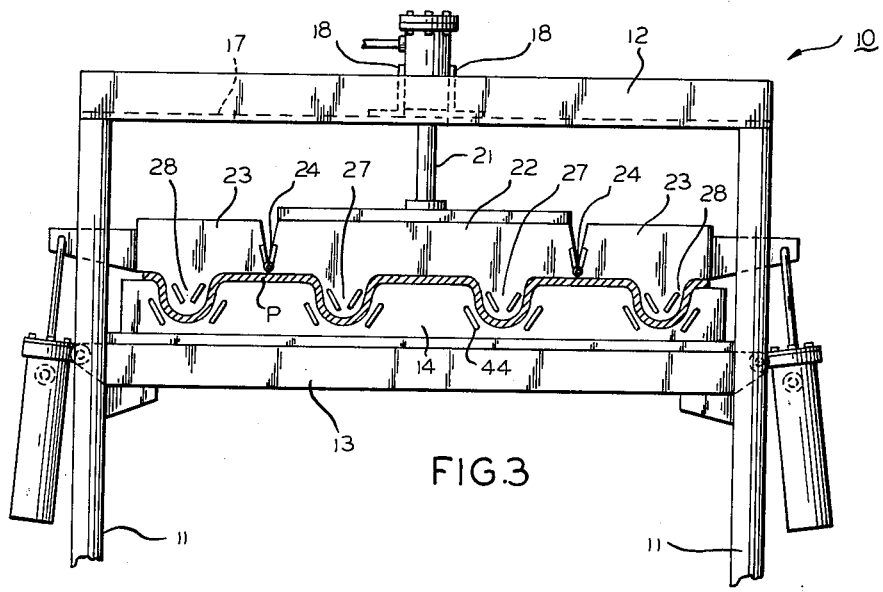
FIG. 3 is a view similar to FIG. 2, but showing the corrugations being formed in the panel by the flanking portions of the upper platen moving toward the lower platen.

As seen in FIG. 2, the central portion 22 is moved against the panel P by the piston rods 21 of the cylinders 19 to form the corrugations C in the central portions of the panel P, and thereafter, as seen in FIG. 3, the flanking portions 23 are then moved into contact with the panel P to provide the corrugation C in the remaining portions of the panel P.

Figure 5:
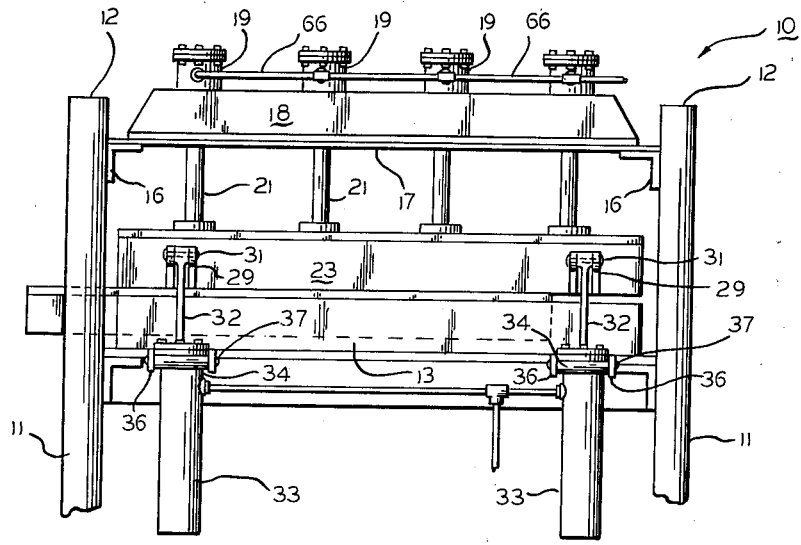
FIG. 5 is an end elevational view of FIG. 3.

Structure is provided for moving the flanking portions 23 from the position seen in FIG. 1 through the position seen in FIG. 2, and ultimately to the position seen in FIG. 3, and to this end each of the flanking portions 23, see FIG. 5, is provided with clevises 29 connected by pins 31 to piston rods 32 of actuating cylinders 33. A collar 34 at one end of each actuating cylinder 33 is held between a clevis 36 extending from the lower stage 13, and the collar 34 is held to the clevis 36 by the pins 37, see again FIG. 5.

Heat is applied to the panel P during the corrugating thereof, the lands 27 and 28 and the grooves 26 having heating elements 39, see FIG. 8, in the surfaces thereof. Heating elements 39 are essentially U-shaped with limbs 41 connected by a bight 42. The limbs 41 and bight 42 enclose resistance elements 43 which are insulated from the platens 14, 22 and 23, by the material of the limbs 41. The heater elements 34 have their limbs 41 extending in bores 44 in the platens described.

Structure is provided for controlling the application of energy to the heaters 39 and the application of motive fluid to the cylinders 19 and 33, and the time of application of both the heating energy and the motive fluid. To this end, and as seen particularly in FIGS. 6 and 7, the machine is supplied with control and heating energy by a multi-phase power supply comprising power leads 46, 47 and 48.

The energy supplied to the heating elements 43, which are shown in FIG. 7 as being arranged in their respective upper and lower platens, is controlled by two magnetic contactor assemblies 49 and 51, contactor assembly 49 controlling the heat to upper platens 22 and 23, and contactor assembly 51 controlling the heat to the lower platen 14. Each contactor assembly includes a contactor coil 52, which when energized closes contacts 46c, 47c and 48c thereat.

Contactor coils 52 are energized by a thermostat switch contact 53T connected in series, each being located at desired points on the upper and lower platens seen in FIG. 7. Contacts 53T are connected in a circuit including a lead 54 connected to the phase lead 48, a lead 56 connected to one end of coil 52 of contact assembly 51 and thence to the phase lead 46. Contacts 53T are likewise connected in a circuit including a lead 57 to the coil 52 of contactor assembly 49 and thence by a lead 58 to the phase lead 46.

A suitable signal 59, audible or visual as desired, is connected in series with the thermostat switch contacts 53T, and is energized only when energy is supplied to resistance elements 43. The circuit for signal 59 includes lead 54 connected to phase lead 48, contacts 53T, a lead 61 having signal 59 in series therewith, lead 61 being connected to phase lead 47 between contactor 51 and heater elements 43.

The movement of the upper platen 22 downward against panel P is controlled by a valve 62 connected to an air supply line 63, see FIG. 6. Valve 62 has a control handle 64 and a valve element, not shown, which can be rocked to a position to supply air pressure to a line 66 connected to cylinders 19. A line 67 having a flow regulating valve 68 regulates the bleeding of air from the opposite side of the piston (not shown) in cylinder 19 to regulate the speed of movement of pressure platen 22. The bled air is ported to exhaust by a line 69 at control valve 62.

The movement of upper platen 22 to the position seen in FIG. 2 thus corrugates the mid-portion of panel P, flanking portions 23 adopting the position seen. The movement of upper platen 22 to the position seen in FIG. 2 now controls the supply of motive fluid to cylinders 33 until the flanking portions 23 move to the position seen in FIG. 3.

The upper platen 22 thus actuates a microswitch MS having a contactor 71 which is contacted by an adjustable actuator 72 mounted on platen 22. Switch MS is connected in a circuit including a lead 73 connected to phase lead 47 and a lead 74 connected to phase lead 48, lead 74 having a solenoid operated valve 76 connected therein, see also FIG. 7. Solenoid valve 76 is energized by closing of switch MS and is arranged to connect air line 63 to a line 77 connected to the cylinders 33, and rock the flanking portions about hinges 24 to the position seen in FIGS. 3 and 6.

The speed of operation of cylinders 33 is regulated by a flow valve 78 connected in a line 79, the opposite end of cylinders 33 being bled to exhaust by line 79 and an exhaust port 81 at solenoid valve 76.

The contactor 71 of switch MS also closes a circuit through an adjustable timer 82 which can be initiated in a timing cycle only when thermostat contacts 53T are closed. Switch MS is accordingly connected in series with a lead 83 branching from lead 57, lead 83 being connected to timer 82, and the circuit through timer 82 being completed by a lead 84 to the phase lead 48.

At the conclusion of the timing cycle, the timer 82 gives a suitable signal, and the operator then reverses valve 62. Air under pressure is now supplied to the opposite end of cylinders 19 to raise upper platen 22. It may be noted that flow regulating valve 68 is of the one-way type and offers no restriction upon reverse flow therethrough. At this time line 66 is connected to exhaust through valve 62.

As soon as platen 22 is lifted slightly, solenoid valve 76 is de-energized, and the valve 76 cycles to supply air pressure to the opposite end of cylinders 33 to pivot flanking platen portions with respect to platen 22. Flow regulating valve 78 does not restrict reverse flow therethrough. Line 77 is now connected to exhaust through solenoid valve 76, and the return movement of flanking portions is thus freely done.

The sequence of operations carried on by the machine disclosed is of extreme importance. By forming the center corrugations first, the edges of panel P can be drawn inward, and the panel can freely shape itself at the center thereof. When the center corrugations are complete, the panel P can still be drawn from the edges thereof inward. This is possible by the rocking movement of the flanking portions 23 in moving against lower platen 14.

The movement of the edges of panel P in the manner described is shown in FIG. 1, where panel P extends beyond lower platen 14. At the completion of the center corrugations the edges of panel P lie inside platen 14, and upon completion of the sequence as seen in FIG. 3, the edges are well inside platen 14.

By the sequence of operations described it is unnecessary to stretch the material in forming the corrugation. With laminar veneer products this is especially important.

Although but one specific embodiment of this invention is herein shown and described, it will be understood that numerous details of the construction shown may be altered or omitted without departing from the spirit of the invention as defined by the following claims.

We claim:
1. A pallet-forming machine comprising,
   (a) a supporting frame,
   (b) a lower planar platen fixed on the frame for support of a panel to have corrugations formed therein,
   (c) an upper platen reciprocably mounted on the frame and having a central portion and two flanking portions hinged to the central portion along the respective lateral edges and disposed outwardly-upward from the plane of the central portion,
   (d) complementary lands and grooves formed in the opposed faces of the lower and upper platens, and
   (e) separate motor means respectively connected to actuate the central and flanking portions of the upper platen.
   (f) heating elements located contiguously along the grooves of the lower platen and in the lands of the upper panel portions,
   (g) control mechanism for activating the motor means for the central platen portion into timed functioning relationship with the lower platen to corrugate the medial part of the panel,
   (h) means actuated by the positioning of the central platen portion in panel forming position relative the lower platen for simultaneously activating the motor means for the flanking platen portions into timed functioning relationship with the lower platen to corrugate the lateral parts of the panel, and

(i) other means actuated by the positioning of the central platen portion in panel-forming relationship with the lower platen for activating the heating elements during the period of panel formation.

2. A pallet-forming machine as set forth in claim 1 wherein the motor means is a system of electrically-controlled hydraulic motors and the heating means are electrical units, and the other means is a microswitch interposed in the electrical system activated by the reciprocation of the central platen portion.

References Cited in the file of this patent

UNITED STATES PATENTS

| | | |
|---|---|---|
| 482,782 | Burkhardt | Sept. 20, 1892 |
| 1,867,581 | Marriett | July 19, 1932 |
| 2,301,028 | Esch | Nov. 3, 1942 |
| 2,368,138 | Hayden | Jan. 30, 1945 |
| 2,766,787 | Knowles | Oct. 16, 1956 |

FOREIGN PATENTS

| | | |
|---|---|---|
| 500,443 | Italy | Nov. 18, 1954 |